UNITED STATES PATENT OFFICE.

FRIEDRICH GRAESSLER, OF CANNSTADT, GERMANY.

MANUFACTURE OF YELLOW COLORING-MATTERS.

SPECIFICATION forming part of Letters Patent No. 253,598, dated February 14, 1882.

Application filed March 13, 1880. (Specimens.) Patented in England January 3, 1879, and in Germany February 13, 1879.

*To all whom it may concern:*

Be it known that I, FRIEDRICH GRAESSLER, of Cannstadt, in the Empire of Germany, chemist, have invented Improvements in the Manufacture of Yellow Coloring-Matters suitable for dyeing and printing, of which the following is a specification.

This invention relates to the preparation of yellow coloring-matter soluble in water and alkalies, suitable for dyeing and printing in a solid manner by the acids or acid-mordants, such coloring-matter being in its chemical constitution sulpho-acid of amidoazo-benzole. I prepare this sulpho-acid by two methods; first, by producing the amidoazo-benzole and then transferring it into the sulpho-acid compound thereof; secondly, by proceeding from or commencing with a sulpho-acid compound of aniline—a sulphanilic acid—and transforming this into the amidoazo-benzole sulpho-acid, or by commencing with a sulpho-acid compound of aniline and transforming this into the corresponding amidoazo-sulpho-acid.

I shall now describe how I operate when following the one or the other method.

First method: The substance amidoazo-benzole (also known as "amido-diphenylimide" and "phenylenhydrozo-amido-benzole") — a compound of the formula $C_{12}H_{11}N_3$—is, as is well-known, to be obtained in various manners, particularly by the action of nitrous acid on aniline or of nitrates on aniline salts. The chief products, mediate or immediate, of this reaction are, as hereinafter described, two isomeric derivatives of the said formula. One—called "diazo-amido-benzole" or "diazo-benzole-amido-benzole"—I understand to be that modification which is decomposed by acids, and is therefore not directly qualified for my first method of treatment, hereinafter described; and the other—the said amidoazo-benzole, which may also be obtained from nitroazo-benzole and from aniline by means known to chemists, and otherwise than as hereinafter described—is a compound which is capable of forming salts with acids, and is also convenient for being transformed into such sulpho-acids as those to which my improvements relate. My first proceeding is therefore directed to get in any way convenient for manufacturing for commercial purposes the amidoazo-benzole or corresponding amidoazo compound of benzole.

To give an example how I operate when I employ nitrites, I mix one part of commercial aniline, one part of aniline salt, (hydrochlorate of aniline,) one part of nitrite of sodium or another nitrite in corresponding weight dissolved in water at a moderate temperature, so that the nitrous acid of the nitrite, or the nitrogen thereof, enters perfectly into combination with the aniline. The primary product of this reaction, which may be considered as consisting partially and mainly of diazo-amido-benzole, passes by prolonged contact with aniline into the said amidoazo-benzole. I allow, therefore, the mass to stand till it shows by combining with acids the above-mentioned power of salt-building, which is characteristic of the amidoazo-benzole modification or form of the substance or substances designated by the said formula $C_{12}H_{11}N_3$. It is then mixed with hydrochloric acid and water to bring into solution the rest of the aniline and to precipitate the hydrochlorate of amidoazo-benzole formed, which is then filtered and dried.

The amidoazo-benzole or its salts are already known as "colored" bodies, but of great instability when tried for dyeing, the salts being too easily decomposed by water and the base having too small an affinity for the fibers of textile materials. Having now found by my researches that the sulpho-acid compounds of amidoazo-benzole, none of which sulpho-acid compounds were before my invention known or described, do not partake of these inconveniences, but, on the contrary, afford fast coloring-matters, I have succeeded in preparing a sulpho-acid in a practical manner which I can apply to amidoazo-benzole or its homologues in general, however obtained, whether according to my method hereinbefore described or any other method.

I now proceed to describe my said method as applied to amidoazo-benzole, which will illustrate and ascertain my method for the preparation of the sulpho-acid of amidoazo-benzole: One part of amidoazo-benzole, or an equivalent of one of its salts, (in preference the hydrochlorate,) is gradually added to from three to five parts of strong fuming sulphuric acid containing about fifteen to twenty per cent. of sulphuric anhydride. My mixture may be made at ordinary temperature, or if perfect solution does not result at ordinary temperature, then it may be raised to and continued at from 90° to 100° centigrade till the testing of a sample drawn from the mass shows that the product is entirely soluble in alkalies and in water, and is therefore perfectly transformed into the sulpho compound or sulphuric acid or acids of amidoazo-benzole. The whole is then poured into water or saline solutions and the excess of free sulphuric acid is washed away or saturated by alkalies. The thus produced sulpho-acid of amidoazo-benzole, which may represent mono or di or even more highly sulphonated compound, is brought into a form convenient for use and sale, which may be either a paste obtained by filtering the precipitated acids or a dry powder obtained by evaporating the solutions in alkalies, whereby I obtain the alkaline salts of these sulpho-acids. The strong fuming sulphuric acid may be replaced by a correspondent weight in parts of the sulphuric anhydride or any compounds or mixtures containing anhydrous sulphuric acid in an active form—as, for example, chlorhydrine of sulphuric acid (otherwise called "sulphuryl-hydroxyl-chloride," "sulphuric chlorhydrate," or "chlorhydro sulphurous acid")—a compound of the formula $SO_3HCl$.

Second method: When, proceeding at once from sulpho-acid compounds of aniline (which may be mono or di sulphanilic acids) or the corresponding sulpho-acid compounds of its homologues, I operate (taking the sulpho compounds of aniline by way of example) as follows: The sulphanilic acids $C_6H_6N(SO_3H)$ or $C_6H_4(NH_2)(SO_2OH)$ and disulphanilic acids $C_6H_5N_3(SO_3H)$ or $C_6H_3(NH_2)(SO_2OH)_2$ are generally obtained by the action of sulphuric acid on aniline at an elevated temperature. As these processes and bodies are well known, I do not enlarge upon them, but I specify the further treatment which I apply to any sulpho compound of aniline of either of the said formulas. To about four parts of either of these sulphanilic acids, or a mixture of the same, are added three parts of hydrochloric acid of 1.15 specific weight and two parts of nitrite of sodium in aqueous solution. There is thus formed the sulpho-diazo benzolic acid or diazo-benzole sulphuric acid—a compound known to have the formula $C_6H_4N_2SO_3$. To this are added about from two to three parts of aniline, and the whole is allowed to stand at a temperature of about 30° to 40° centigrade until (in a manner analogous to the formation of the basic bodies diazoamido-benzole and amidoazo-benzole themselves, hereinbefore described) there are formed again sulpho-acids of diazoamido-benzole, which pass into the sulpho-acid or acid of amidoazo-benzole as final product or products of the reaction, and which are identical with the product or products obtained in the way hereinbefore in the first place described. The residue of aniline remaining unconverted is also taken away by hydrochloric acid, the sulpho-acid precipitated by common salt, and finally treated as aforesaid to purify it and bring it into a form convenient for use and sale.

Having now described and particularly ascertained the nature of my invention and the modes in which the same may be carried into effect, I wish to observe that what I claim is—

As a new product, the coloring-matter of a yellowish shade which consists of the sulpho-acid of amidoazo-benzole, substantially as described.

In testimony whereof I have signed my name to this specification in the presence of two subscribing witnesses.

Cannstadt, December 24, 1879.

FRIEDRICH GRAESSLER. [L. S.]

Witnesses:
    CARL BACHMANN,
    FRIEDRICH RUSSMAUL,
      *Both of Cannstadt.*